(12) United States Patent
Johnson et al.

(10) Patent No.: US 6,377,306 B1
(45) Date of Patent: Apr. 23, 2002

(54) METHOD AND APPARATUS FOR PROVIDING A SEAMLESS TILED DISPLAY

(75) Inventors: Michael J. Johnson; Matthew B. Dubin, both of Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/159,340

(22) Filed: Sep. 23, 1998

(51) Int. Cl.[7] .............................. H04N 9/12; H04N 5/74
(52) U.S. Cl. ....................... 348/383; 348/744; 348/785; 348/778
(58) Field of Search ................................ 348/383, 778, 348/36, 744, 745, 746, 747, 756, 781, 785; 345/1.1, 4, 1.3, 19; H04N 5/66, 9/12, 5/74

(56) References Cited

U.S. PATENT DOCUMENTS

| | | | |
|---|---|---|---|
| 3,833,764 A | 9/1974 | Taylor | 178/7.5 D |
| 4,103,435 A | 8/1978 | Herndon | 35/12 N |
| 4,974,073 A | 11/1990 | Inova | 358/87 |

(List continued on next page.)

FOREIGN PATENT DOCUMENTS

| | | |
|---|---|---|
| EP | 0 739 131 A | 10/1996 |
| EP | 0739133 A | 10/1996 |
| EP | 0786687 A | 7/1997 |
| FR | 2 660 090 A | 9/1991 |
| WO | 99/29116 | 6/1999 |
| WO | 99/31877 | 6/1999 |

OTHER PUBLICATIONS

Patent Abstracts of Japan, JP 57–111187 (NEC Home Electronics, Ltd.) Dec. 27, 1980.

Bergstedt, Robert et al., "Microlaser–based Displays," *SPIE*, vol. 3057, (1997) pp. 362–367.

Collins, Robert T. et al., "Matching Perspective Views of Coplanar Structures using Projective Unwarping and Similarity Matching,"IEEE Conference on Computer Vision and Pattern Recognition, Jun. 1993, 10 pages.

Cruz–Neira, Carolina et al., "Surround–Screen Projection–Based Virtual Reality: The Design and Implementation of the CAVE," *SIGGRAPH 93*, Computer Graphics Proceedings, Annual Conference Series, (1993) pp. 135–142.

Czernuszenko, Marek et al., "The ImmersaDesk and Infinity Wall Projection–Based Virtual Reality Displays," *Computer Graphics*, May 1997, pp. 46–49.

Freeman, K.G., "A Multi–Standard High–Definition Television Projector," *The Journal of the Institute of Electronic and Radio Engineers*, vol. 55, No. 2, Feb. 1985, pp. 47–53.

Fuchs, Henry et al., "Virtual Space Teleconferencing using a Sea of Cameras," 7 pages.

Gonzalez, Rafael C. et al., *Digital Imaging Processing*, 2nd Edition, pp. 246–251.

(List continued on next page.)

*Primary Examiner*—Sherrie Hsia
(74) *Attorney, Agent, or Firm*—John G. Shudy, Jr.

(57) ABSTRACT

A display for producing a seamless composite image from at least two discrete images. The display includes one or more projectors for projecting each of the discrete images separately onto a screen such that at least one of the discrete images overlaps at least one other of the discrete images by more than 25 percent. The amount of overlap that is required to reduce the seams of the composite image to an acceptable level over a predetermined viewing angle depends on a number of factors including the field-of-view and aperture size of the projectors, the screen gain profile, etc. For rear-projection screens and some front projection screens, an overlap of more than 25 percent is acceptable.

38 Claims, 15 Drawing Sheets

U.S. PATENT DOCUMENTS

| | | | |
|---|---|---|---|
| 5,136,390 A | 8/1992 | Inova et al. | |
| 5,216,504 A | 6/1993 | Webb et al. | 358/139 |
| 5,231,481 A | 7/1993 | Eouzan et al. | 358/60 |
| 5,396,257 A | 3/1995 | Someya et al. | |
| 5,475,447 A | 12/1995 | Funado | |
| 5,543,870 A | 8/1996 | Blanchard | 353/74 |
| 5,555,035 A | 9/1996 | Mead et al. | 348/757 |
| 5,626,410 A | 5/1997 | Chambers et al. | 353/94 |
| 5,657,073 A | 8/1997 | Henley | 348/38 |
| 5,661,531 A | 8/1997 | Greene et al. | 349/73 |
| 5,668,569 A | 9/1997 | Greene et al. | 345/103 |
| 5,737,038 A | 4/1998 | Gale et al. | 348/759 |
| 5,793,441 A | 8/1998 | Hagerman | |
| 5,796,425 A | 8/1998 | Minami et al. | 348/181 |
| 5,838,396 A | 11/1998 | Shiota et al. | 348/745 |
| 6,018,361 A | 1/2000 | Fujii et al. | 348/180 |

OTHER PUBLICATIONS

Holmes, Richard E., "Videorama™—A New Concept in Juxtaposed Large Screen Displays," *SPIE*, vol. 1081, (1989) pp. 15–20.

Ishii, Hiroshi et al., "Iterative Design of Seamless Collaboration Media," *Communications of the ACM*, vol. 37, No. 8, Aug. 1994, 16 pages.

Iwata et al., "A Seamless Multiscreen Display," *Mitsubishi Denki Giho*, vol. 71, No. 2 (1997), pp. 80–83 (with English translation attached).

Lin, Chun–Chuan et al., "Performance Measurement of Projection Display," *SPIE*, vol. 2892, (1996) pp. 148–153.

Mayer, Theo., "Design Considerations and Applications for Innovative Display Options Using Projector Arrays," *SPIE*, vol. 2650, (1996) pp. 131–139.

Raskar, Ramesh et al., "Efficient Image Generation for Multiprojector and Multisurface Displays," Department of Computer Science, University of North Carolina, (1998) 12 pages.

Raskar, Ramesh et al., "The Office of the Future: A Unified Approach to Image–Based Modeling and Spatially Immersive Displays," *SIGGRAPH 98*, Computer Graphics Proceedings, Annual Conference Series, (1998) pp. 1–10.

Tsai, Roger Y., "An Efficient and Accurate Camera Calibration Technique for 3D Machine Vision," *Proceedings CVPR '86*, IEEE Computer Society, (1986) pp. 364–374.

Wang, K.C. et al., "Assessment of Metal Halide Lamp for the Illumination of LCD–Based Projection Display," *SPIE*, vol. 2407, (1995) pp. 36–46.

Wolberg, George, *Digital Image Warping*, IEEE Computer Society Press Monograph, pp. 50–51.

Pamphlet, *MIMiCAM™ Automated Monitor Alignment & Inspection System*, Display Laboratories, Inc., (1994) 6 pages.

Patent Abstracts of Japan, vol. 1996, No. 01, Jan. 31, 1996 and JP 07239504 A (Mitsubishi Heavy Ind. Ltd.) Sep. 12, 1995 abstract.

Patent Abstracts of Japan, vol. 1996, No. 09, Sep. 30, 1996 and JP 08 126018A (Hitachi Ltd.) May 17, 1996 abstract.

Patent Abstracts of Japan, vol. 1995, No. 06, Jul. 31, 1995 and JP 07 064522 A (Hitachi Ltd.) Mar. 10, 1995 abstract.

Patent Abstracts of Japan, vol. 1996, No. 4, Jun. 28, 1996 and JP 08 050469 A (Hitachi Denshi Ltd) Feb. 20, 1996.

Patent Abstracts of Japan, vol. 1996, No. 4, Apr. 30, 1996 and JP 07 333760 A (Hitachi) Dec. 22, 1995.

Patent Abstracts of Japan, vol. 015, No. 037 (P–1159) Jan. 29, 1991 & JP 02 273790 A (Nippon Telegr & Teleph Corp), Nov. 8, 1990 abstract: figures 1–6.

Patent Abstracts of Japan, vol. 012, No. 049 (E–582), Feb. 13, 1988 & JP 62 195984 A (Sony Corp), Aug. 29, 1987 abstract.

Patent Abstracts of Japan, vol. 016, No. 352 (E–1241), Jul. 29, 1992 & JP 04 108279 A (Matsushita Electric Ind Co Ltd), Apr. 9, 1992 abstract.

Patent Abstracts of Japan, vol. 007, No. 236 (E–205) Oct. 20, 1983 & JP 58 125986 A (Mitsubishi Denki KK), Jul. 27, 1983 abstract.

METHOD AND APPARATUS FOR PROVIDING A SEAMLESS TILED DISPLAY

CROSS REFERENCE TO CO-PENDING APPLICATIONS

The present application is related to U.S. patent application Ser. No. 09/158,995, filed Sep. 23, 1998, entitled "METHOD AND APPARATUS FOR CALIBRATING A TILED DISPLAY"; and U.S. patent application Ser. No. 09/159,024, filed Sep. 23,1998, entitled "METHOD AND APPARATUS FOR CALIBRATING A DISPLAY USING AN ARRAY OF CAMERAS", both of which are assigned to the assignee of the present invention and incorporated herein by reference.

The invention described herein was made in the performance of work under NASA Contract NAS1-20219 and is subject to the provisions of Section 305 of the National Aeronautics and Space Act of 1958, as amended (42 USC 2457).

BACKGROUND OF THE INVENTION

This invention relates to the field of projection displays, and more particularly, to tiled projection displays that use multiple projectors to produce a larger and/or a higher resolution image.

Multiple projector system have been proposed and used for many years. In the 1950s, the "CINERAMA" system was developed for the film industry. The CINERAMA system used three films to project three images using three separate projectors, which were then combined to form a single panoramic image. Disneyland continues to use a similar multiple projector system, wherein a circle of projectors shine onto a screen that circles the wall of a round room.

In the video field, multiple projector systems have been proposed and used for a number of specialty applications. U.S. Pat. No. 4,103,435 to Herndon and U.S. Pat. No. 3,833,764 to Taylor suggest using multiple projector systems for flight simulators. In many of these systems, multiple video screens are placed next to each other to form a large image display. A difficulty with many of the video based multiple projector display systems is that the multiple images often do not appear as one single continuous image on the display screen. When two images are projected side by-side on a single screen, there is normally a seam between the images. The final display image will either appear as two images placed side-by-side with a gap therebetween or, if the images are made to overlap on a single screen, with a bright line therebetween. Because of the inconsistencies in conventional cameras, video processing and delivery channels, displays and specifically projectors, it is exceedingly difficult to perfectly match the resultant video images so that no tiling artifact appears among the images. If the images are brought very close together on the same screen, there are typically both gaps and overlaps at each seam.

U.S. Pat. No. 4,974,073 to Inova suggests a method for producing a seamless image from multiple discrete images by intentionally overlapping the images, thereby omitting the gaps, and then reducing the brightness of the discrete images in the overlapping region of each image. Inova recognizes that increasing the overlap reduces the size of the resulting composite image, and thus reduces the overall efficiency of the projection system. Thus, Inova appears to suggest that the overlap should be minimized. In FIG. 1A of Inova, three discrete images are shown, each having an overlap of about 11% with the adjacent images. Because of this relatively small overlap, Inova states that the composite image, which appears on the screen and is referred to as the apparent image, is almost three times as wide as a normal video image. To be almost three times as wide as the normal video image, the overlap of the images must be relatively small.

Like Inova, the article entitled *Design Considerations and Applications for Innovative Display Options Using Projector Arrays*, by Theo Mayer, SPIE Vol. 2650 (1996), pp. 131–139, discloses projecting a number of discrete images in an overlapping relation and ramping the brightness of the discrete images in the overlapping regions of each image. Unlike Inova, Mayer also discloses using a blending function to fade down each overlapping edge of the discrete images to compensate for the gamma (video signal reduction vs. light output curve) of a phosphor, with the goal of producing uniform brightness across the overlap region. In all cases, Mayer shows an overlap of 25% or less.

Mayer also states that to achieve a seamless display over a reasonable range of viewing angles, a screen gain of one is required (e.g. Lambertian). Mayer states that screen gain is achieved by optically bending the light that hits the screen back toward the center of the screen. This is typically accomplished by narrowing the viewing angle of the screen and redirecting the light toward the viewer. Mayer states, however, that this scheme only works when the light emanates from a single point.

In a tiled display, the light rays are provided across the screen in a complex arrangement which is dependent on the position of the viewer. When the position of the viewer changes, the complex arrangement of the light rays also changes. Mayer recognizes this for front projection systems, and concludes that it may be possible to adjust all of the colorimitry and edge blend parameters of the array to make a perfectly seamless and integrated image, but only at one location. Mayer states that if the eye point is shifted left or right from this calibrated location, all the reflectivity relationships change and the seams again appear. To overcome this difficulty, Mayer states that a screen gain of one (e.g. Lambertian screen profile) is required. A screen gain of one, by definition, diffuses the light and provides the same luminance in all directions. By providing the same luminance in all directions, the viewing angle dependence is necessarily reduced, allowing a wider viewing angle for the tiled display.

Both Inova and Mayer appear to be directed toward front projection display systems. Front projection displays typically use reflective type screens, which can be produced with Lambertian screen profiles (e.g. screen gain of one) in an efficient and cost-effective manner. Rear projection screens, however, cannot easily be made with Lambertian gain profiles.

FIG. 1 and FIG. 2 illustrate the passive gain characteristics of a typical rear projection screen. The gain profiles shown are relative to a uniformly scattering ideal diffuser (e.g. Lambertian screen). In the example screen gain profile, a ray of light having a bend angle of 0 degrees, will have a strength about 2.2 times greater than if it were to pass through uniformly scattering, unity gain or Lambertian screen. Similarly, a ray with a bend angle of 45 degrees will be seen with only about 40% the normalized strength relative to the output of a Lambertian diffusion element. Significantly, this non-linear attribute, which many screens have, implies the output image of the projection system varies with viewing angle. Thus, images seamlessly tiled and calibrated at one viewing position will have seams when viewed from another slightly different viewing position.

One approach for reducing the effects of a non-Lambertian screen is to reduce the angular distribution of the input light that is provided to the screen. This has been accomplished by providing a Fresnel lens, for example, on or near the backside of the screen. This approach is at least somewhat effective for display systems that have only a single projector. However, for multiple projector tiled display systems, this approach tends to enhance the visibility of the seams. That is, the Fresnel lens tends to introduce discontinuities between tiles, which can make it more difficult to eliminate the seams from the display.

What would be desirable, therefore, is a seamless tiled projection system that does not require a Lambertian screen, and yet provides a seamless image over a wider viewing angle than that of the prior art.

SUMMARY OF THE INVENTION

The present invention overcomes many of the disadvantages of the prior art by providing a seamless tiled display system that does not require a Lambertian screen, and yet provides a seamless image over a wider viewing angle than that of the prior art. It has been found that increasing the amount of overlap decreases the amount of seam modulation that occurs over a given viewing angle. Accordingly, the present invention achieves a seamless image by providing a larger overlap than is recognized by the prior art, and more specifically, an overlap of more than 25%, and preferably an overlap of 50% or more. In addition, it has been found that by adjusting the overlap of the discrete images (from 0% to 50% or more), the field of view of the number of projectors, the non-linear attributes of the screen, and the blending function, a desired seam modulation can be achieved over a desired viewing angle. The present invention may be used for both front and rear projection systems.

In an illustrative embodiment, a display is provided for producing a seamless composite image from at least two discrete images. The display includes a projection means for projecting each of the discrete images separately onto a screen. The projection means projects the discrete images such that at least one of the discrete images overlaps at least one other of the discrete images by more than 25 percent, thereby forming at least one overlap region. Preferably, a blending means is provided for blending a selected characteristic of at least one of the discrete images in the at least one overlap region. The selected characteristic may be brightness, color, etc.

In an illustrative embodiment, the projection system is a rear projection system, wherein each of the projectors provide an image to the rear side of a transmissive screen. As indicated above, it is difficult to produce a rear projection screen that has a Lambertian gain profile. Thus, it is contemplated that the field-of-view of the projectors and the overlap therebetween may be adjusted until the seams of the composite image are at an acceptable level over a predetermined viewing angle. This may be accomplished with an overlap of more than 25%. In some systems, an overlap of 50% or more may be required. The 50% value, as an example value, also demarcates a packing arrangement which is fully redundant, leading to significant fail-operational system attributes. Fail operational means that a component can fail but the system continues to be fully operational. With a 50% overlap, if one projector fails, at least one more is ready to fill in the void. This results in significant gains in system reliability.

The amount of overlap that is required to reduce the seams of the composite image to an acceptable level over a predetermined viewing angle may depend on a number of factors including the field-of-view and aperture size of each of the projection means, the screen gain profile, the blending function used, etc. To reduce the overlap that is required, it is contemplated that the field-of-view of the projection means may be reduced. By reducing the field-of-view of the projection means, the angular distribution of the light input provided to the screen is reduced, and the shift variance of the output image is reduced as described above.

To help reduce the field of view of the projection means, it is contemplated that one or more lenses may be provided adjacent selected projectors. The lenses are preferably spaced from the screen so that the images produced by adjacent projectors are allowed to overlap on the screen. A small blending region then provides a gradual transition from one tile to the next.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention provides a seamless tiled projection system that does not require a Lambertian screen, and yet is capable of providing a seamless image over a wider viewing angle than that of the prior art. It has been found that increasing the amount of overlap decreases the amount of seam modulation that occurs over a given viewing range. Accordingly, the present invention contemplates providing a larger overlap than is recognized by the prior art, and more specifically, an overlap of more than 25%. By providing an overlap of more than 25%, and preferably about 50% or more, the seams in the composite image may be reduced over a wider viewing angle. In addition, it has been found that by adjusting the overlap of the discrete images (from 0% to 50% or-more), the field of view of the number of projectors, the non-linear attributes of the screen, and the blending function, a desired seam modulation can be achieved over a desired viewing angle.

In accordance with in illustrative embodiment of the present invention, a number of projectors are tiled together into an array. Each projector projects an image onto a screen. By properly selecting the field-of-view and spacing of the projectors, the images at the screen can be overlapped by more than 25%. Further, by increasing the field-of-view of the projectors, and/or reducing the spacing between projectors, the images at the screen can be overlapped by about 50% or more.

Figure 3:
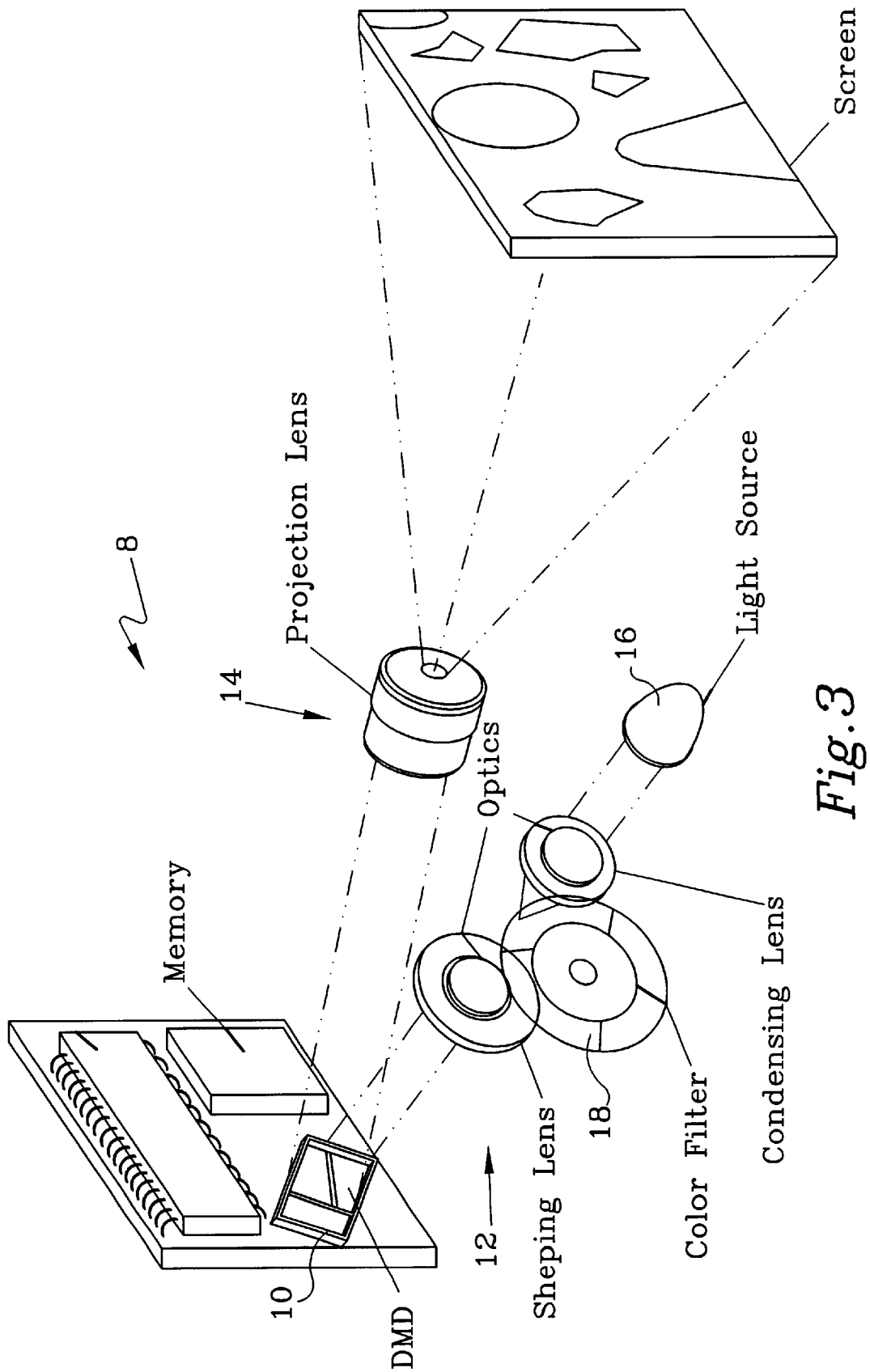
FIG. 3 shows an illustrative projector for use in the present invention.

An illustrative projector of the present invention is shown in FIG. 3. The projector is generally shown at 8, and uses one Digital Micromirror Device (DMD) 10. DMD devices typically include an array of electronically addressable, movable square mirrors that can be electro-statically deflected to reflect light. The use of a DMD device can provide a lightweight, reliable, digital display with a wide viewing angle and good picture clarity. Some DMD devices meet various MIL-STD-810 environmental and stress requirements, and can display color graphic, text and video data at various frame rates.

The projector 8 also may include various optical elements to properly prepare the incoming illuminations to illuminate the DMD 10, and project the outgoing image. As shown in FIG. 3, the optical path may includes two segments including the illumination path 12 and the projection path 14. The illumination path starts with a high-reliability, metal halide, short-arc lamp 16 that illuminates the DMD 10. The light from the arc lamp 16 passes into a rotating RGB color filter wheel 18. An illumination relay lens magnifies the beam to illuminate the DMD 10 and form a telecentric image at the DMD 10. A Total Internal Reflection (TIR) prism enables the incoming light from the lamp to pass onto the DMD 10, and back into the projection optics. Depending on the rotational state of the mirror (e.g.±10 degrees for on/off), the light from the DMD 10 is directed into the pupil of the projection lens (on) or away from the pupil of the projection lens (off). A multiple-element projection cell magnifies the image coming off the DMD 10, at the desired MTF, lateral color, and distortion.

Each projector 8 also preferably includes an electronics module (not explicitly shown in FIG. 3). The electronics module may take the incoming data signals, convert the temporal signals into spatial representations on the DMD 10, and control the filter 18 that provides the sequential color for the display. Preferably, the electronics are modular, allowing an arbitrary number of projectors to be tiled together without significant modifications to the electronics. Further tiling algorithms may be incorporated into the electronics, as appropriate, to enable "smart"0 projectors. This may allow the electronics of each projector to automatically or manually adapt to an arbitrary configuration of projectors.

Figure 4:
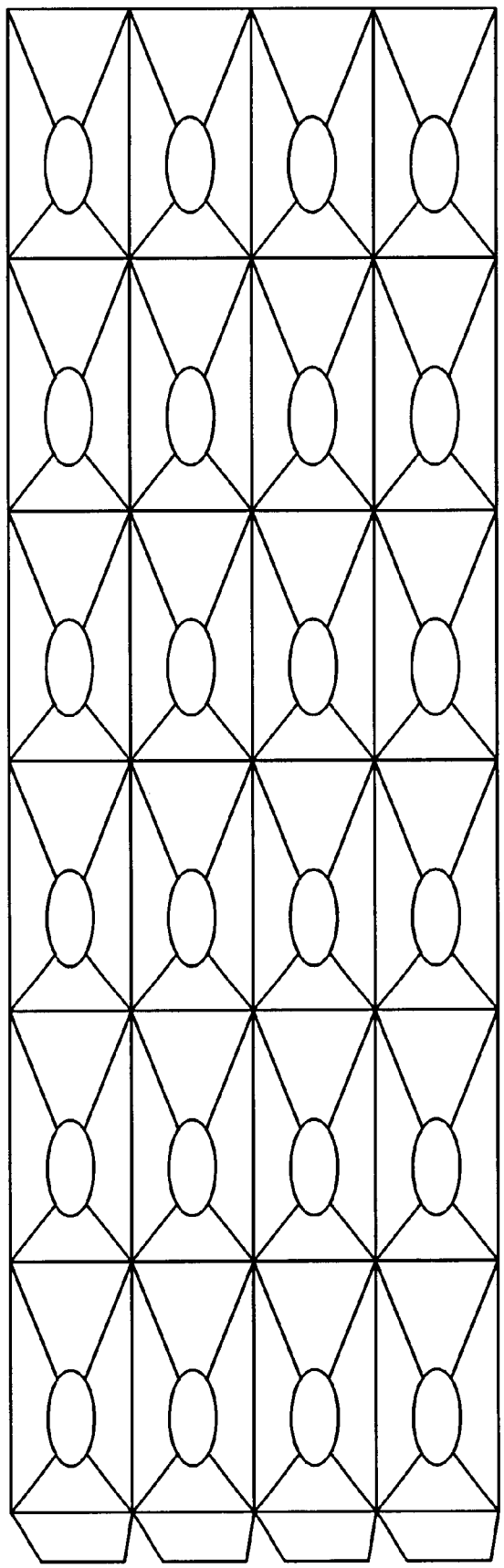
FIG. 4 shows a four-by-six array of the projectors of FIG. 3.

FIG. 4 shows a four-by-six array of projectors. In one embodiment, the processing electronics is packaged between the individual projectors. In another embodiment, the processing electronics is packaged in a rack-type chassis. A further discussion of illustrative processing electronics and the operation thereof maybe found in U.S. patent application Ser. No. 09/158,995, filed Sep. 23, 1998, entitled "METHOD AND APPARATUS FOR CALIBRATING A TILED DISPLAY"; and U.S. patent application Ser. No. 09/159,024, filed Sep. 23, 1998, entitled "METHOD AND APPARATUS FOR CALIBRATING A DISPLAY USING AN ARRAY OF CAMERAS".

Figure 5:
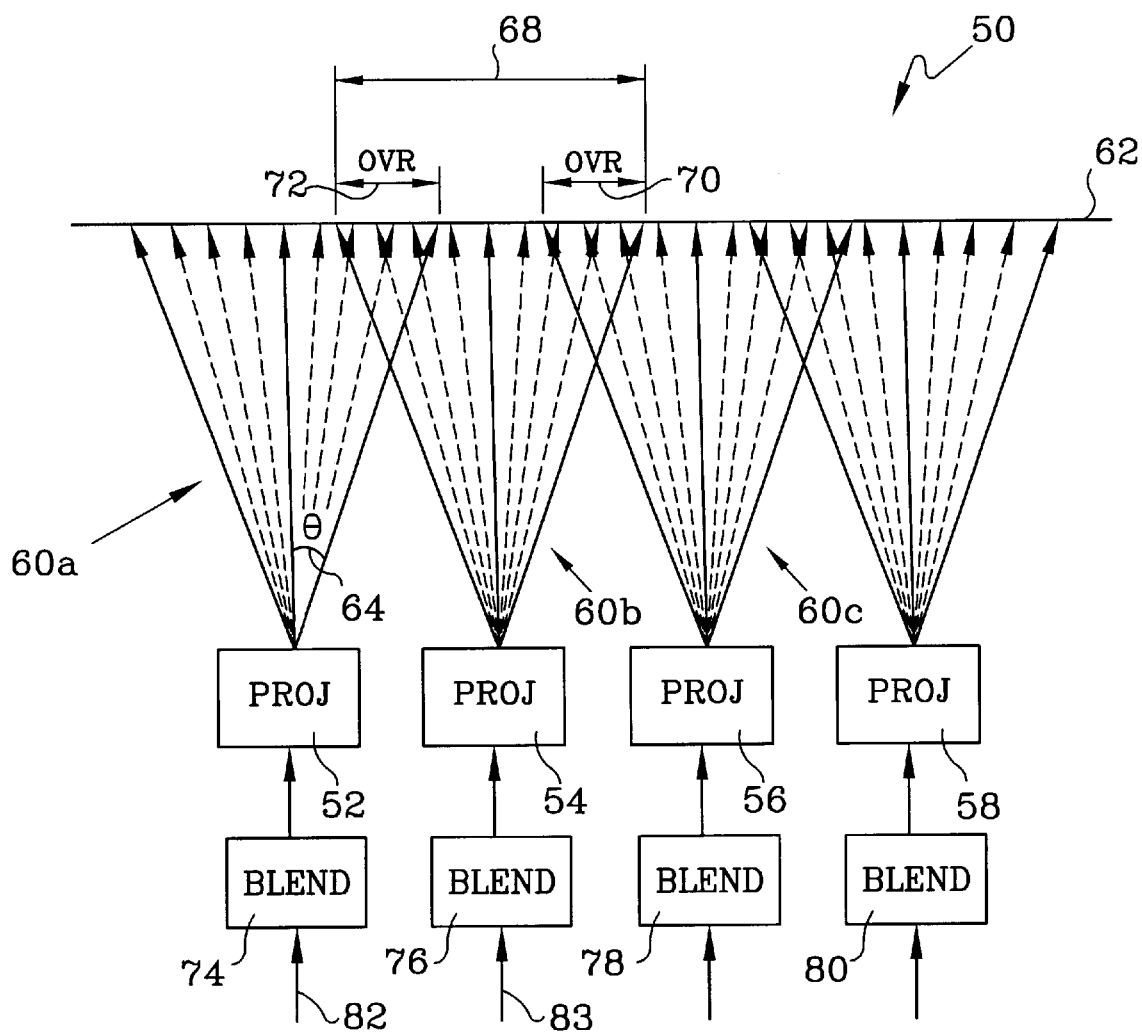
FIG. 5 is a schematic diagram of a display with four projectors, wherein each projector projects an image that overlaps the adjacent images by more than 25%.

FIG. 5 is a schematic diagram of a display 50 having four projectors 52, 54, 56 and 58. Each of the projectors projects a discrete image onto screen 62. The size of each image on the screen depends on the field-of-view of the projectors, and the distance between the projectors and the screen 62. In the illustrative embodiment, each of the projectors has a field of view of θ, as shown at 64, which produces an image size as shown at 68.

Preferably, the field-of-view is adjusted to achieve a desired image size. Thereafter, and in accordance with the present invention, each of the projectors are spaced from one another so that the discrete images on the screen overlap by more than 25%. As shown in FIG. 5, the light spray pattern 60b from projector 54 overlaps the light spray pattern 60a from projector 52 by more than 25%, as shown at 72. Likewise, the light spray pattern 60b from projector 54 overlaps the light spray pattern 60c from projector 56 by more than 25%, as shown at 70. By providing an overlap of more than 25%, the present invention provides an improved seamless tiled projection system that does not require a Lambertian screen, and yet still provides a seamless image over a wider viewing angle than that of the prior art.

It is contemplated that the overlap may be larger in one direction relative to another direction. For example, a display having a substantial overlap in the horizontal direction may have little or no overlap in the vertical direction. This would be useful for a user whose height does not vary much, such as a person sitting at a desk. Likewise, in a fighter cockpit application, the field-of-view of the viewer may be narrowed to a small headbox of +−3 inches horizontally and about +−1/2 vertically. This narrow viewer field-of-view means that less overlap may be acceptable while still maintaining a seamless look for the pilot.

The information in the video signals corresponding to the overlap regions 70 and 72, is duplicated in the video signals for the three images provided by projectors 52, 54 and 56. That is, for overlap 72, the right portion of the image projected by projector 52 must be virtually identical to the left portion of the image projected by projector 54. Otherwise, neither of the overlapping portions of the images will appear clearly on the screen.

It is contemplated that a blending block may be provided for each projector, or alternatively, a blending block may be provided for all of the projectors. In the illustrative embodiment, each projector has a corresponding blending block. For example, projector 52 has blending block 74, projector 54 has blending block 76, projector 56 has blending block 78, and projector 58 has blending block 80. Each of the blending blocks blend a selected characteristic of at least one of the discrete images in the corresponding overlap region. For example, blending block 74 may apply a blending function to the video signal 82 to blend a selected characteristic of the image provided by projector 52 in the overlap region 72.

Likewise, blending block 76 may apply a blending function to the video signal 83 to blend a selected characteristic of the image provided by projector 54 in the overlap region 72. The selected characteristic may be brightness, color, etc. The blending function may be similar to that described in U.S. Pat. No. 4,974,073 to Inova and/or U.S. Pat. No. 5,668,569 to Greene et al.

Figure 6:
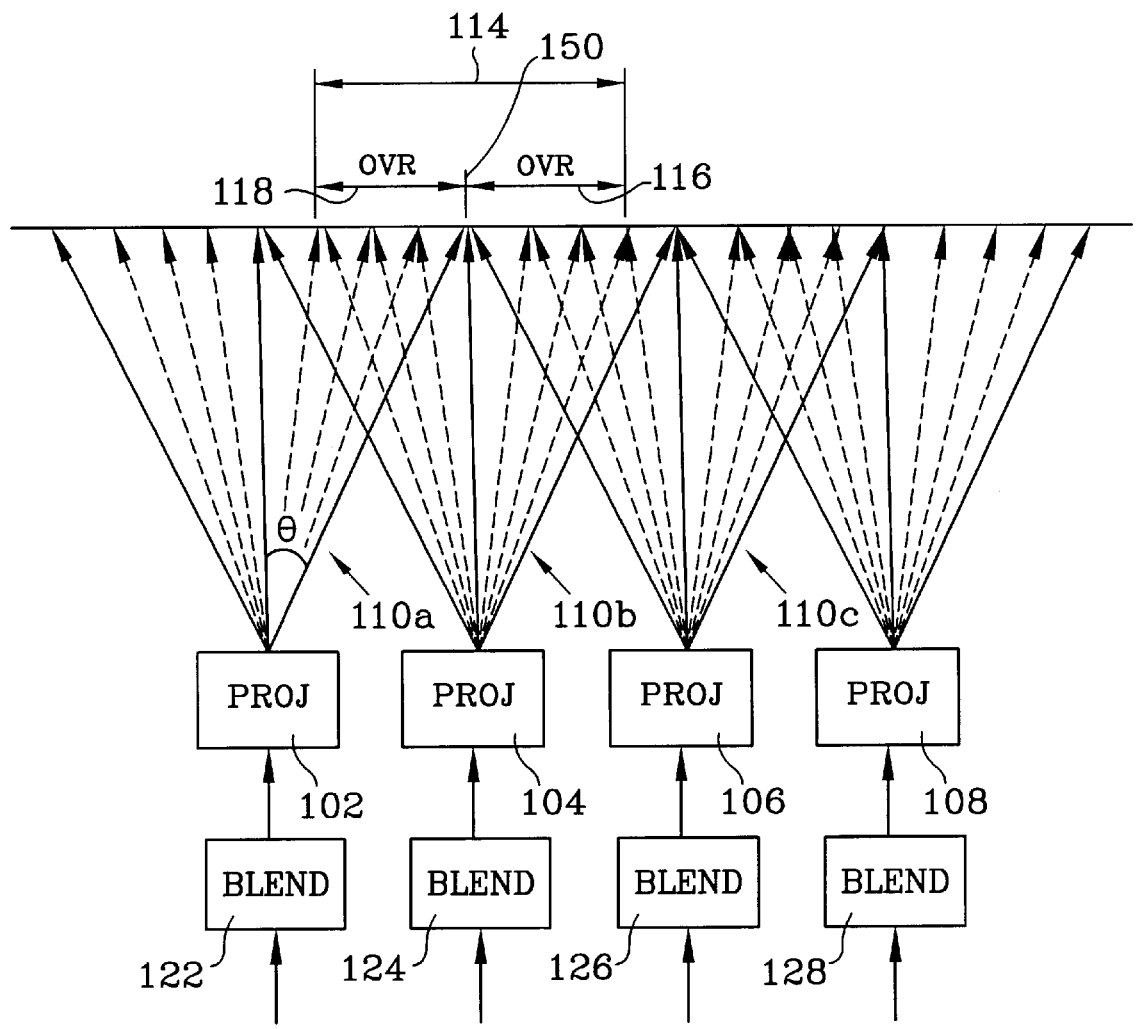
FIG. 6 is a schematic diagram of a display with four projectors, wherein each projector projects an image that overlaps the adjacent images by about 50%.

FIG. 6 is similar to FIG. 5 but includes about a 50% overlap of adjacent images. As indicated above, the amount of overlap that is required to reduce the visibility of the seams of the composite image to an acceptable level over a predetermined viewing angle depends on a number of factors including the field-of-view and aperture size of each of the projectors, the screen gain profile, etc. In an illustrative embodiment, the projection system is a rear projection system, wherein each of the projectors provides an image to the rear side of a transmissive screen. It is often difficult and/or expensive to produce a rear projection screen that has a Labertian gain profile. Thus, it is contemplated that both the field-of-view of the projectors and the spacing between projectors can be adjusted until the seams of the composite image are at an acceptable level over a predetermined viewing angle. In some systems, this may require an overlap of about 50% or more. As shown in FIG. 6, the light ray spray pattern 110b from projector 104 overlaps the light spray pattern 110a from projector 102 by about 50%, as shown at 118. Likewise, the light ray spray pattern 110b from projector 104 overlaps the light spray pattern 110c from projector 106 by about 50%, as shown at 116.

The 50% value, as an example value, also demarcates a packing arrangement which is fully redundant, leading to significant fail-operational system attributes. Fail operational means that a component can fail but the system continues to be fully operational. In this case, if one projector were to fail, at least one more is ready to fill in the void. This implies significant gains in system reliability. The gain in reliability may be derived from the fact that for a portion of the image projected on the screen to be absent of information, the total probability of failure is now the ANDing of the probabilities of failure of several redundant channels. Therefore, using the overlap principle, perhaps in combination with small field of view projectors, the viewing angle variance of many non-Lambertian screens can be attenuated sufficiently for seamless tiling applications.

Figure 7:
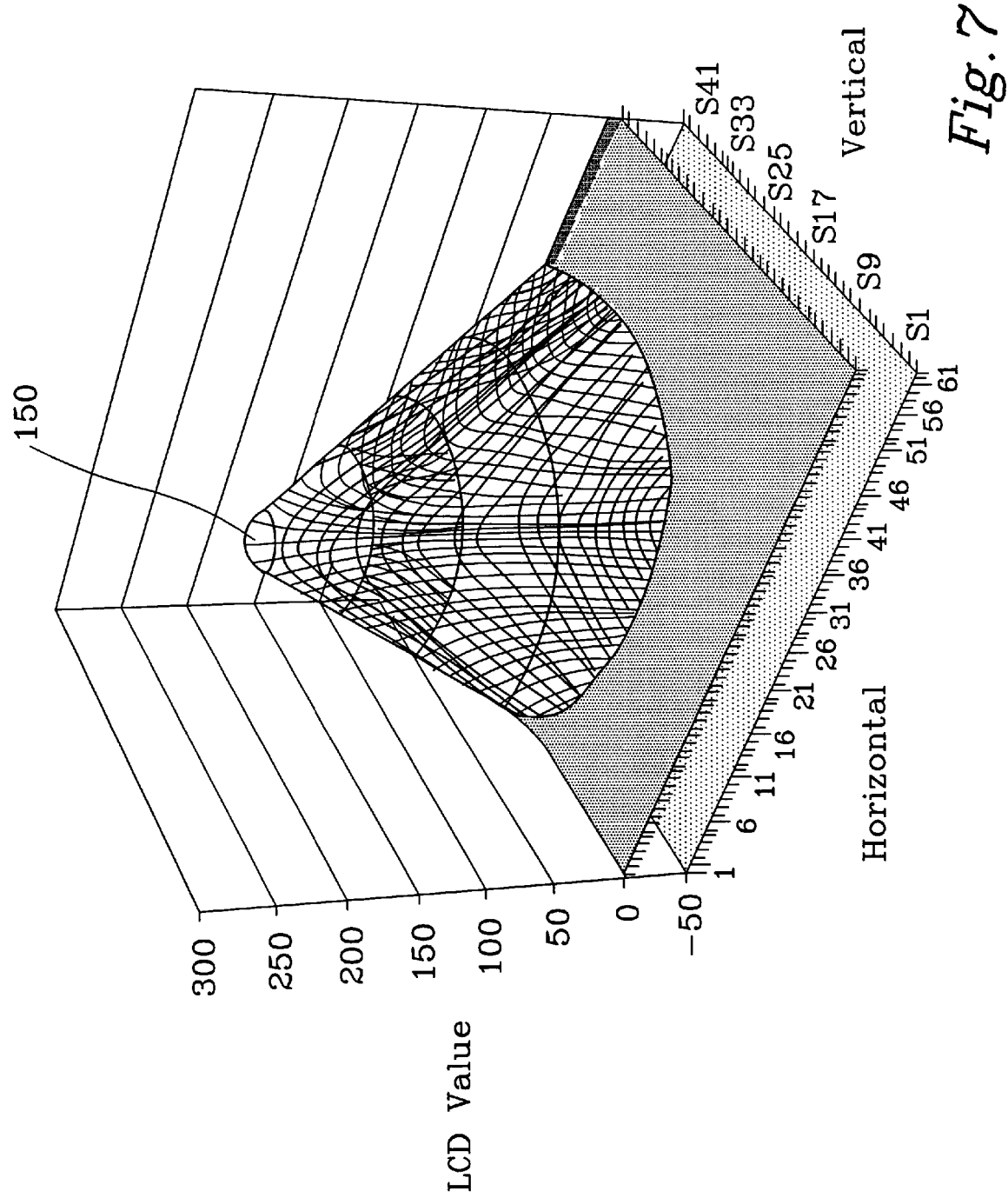
FIG. 7 is a plot of an illustrative blending function for use in conjunction with a display having an overlap of 50%.

In a preferred embodiment, the blending function performed by blending blocks 122, 124, 126 and 128 is similar to that shown in FIG. 7. FIG. 7 shows a two-dimensional linear ramp blending function. The two-dimensional linear ramp blending function of the illustrative embodiment extends to the center 150 of the image to compensate for the 50% overlap of the images. It is contemplated that the blending function may also be a spline, trigonometric, polynomial, $cosine^2$ or any other type of function.

Figure 8:
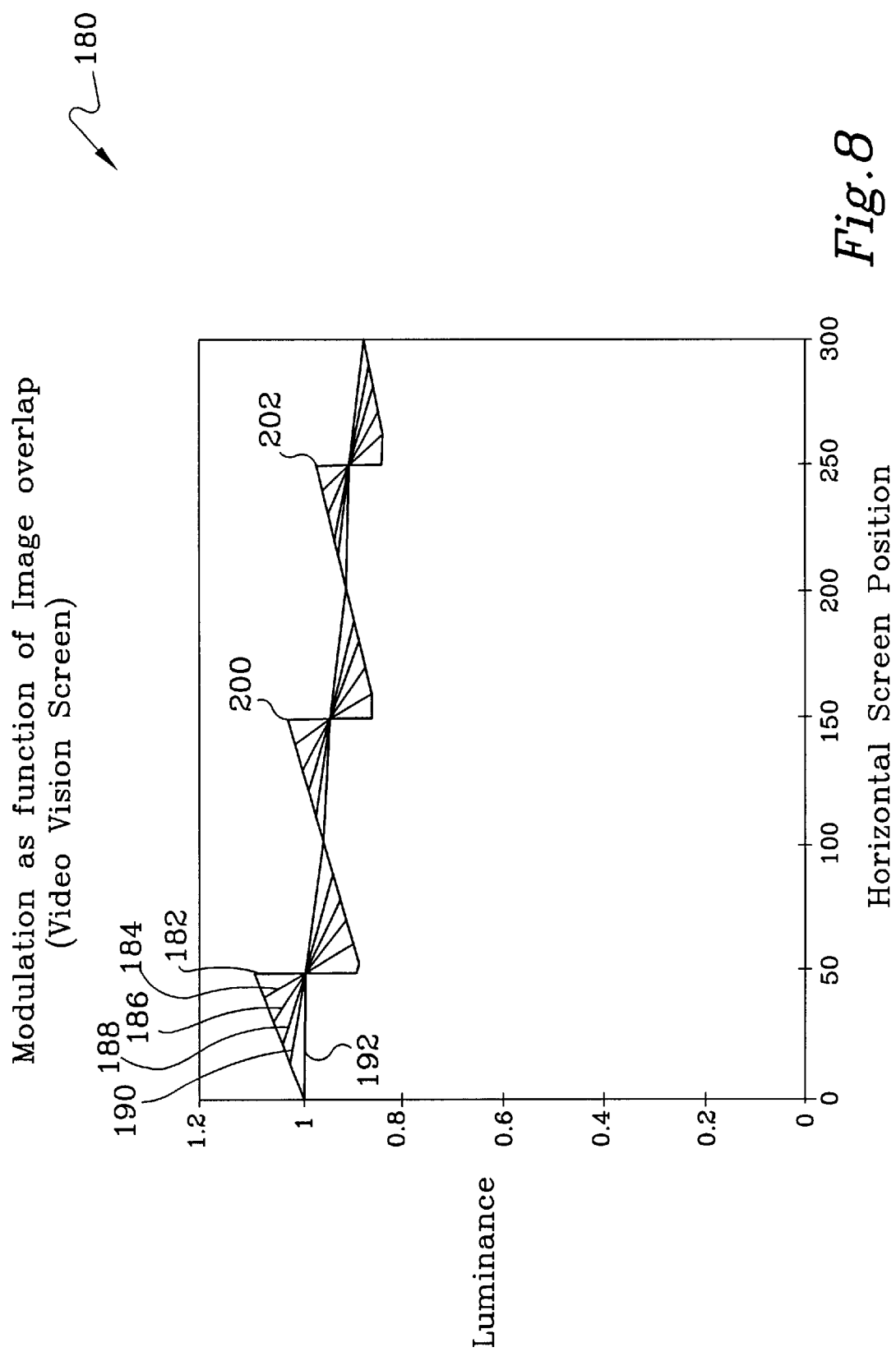
FIG. 8 is a chart showing luminescence modulation as a function of screen overlap.

FIG. 8 is a chart showing luminescence as a function of screen overlap when viewed 20 degrees off the axis of compensation. A line representing the modulation of a display having zero percent overlap is shown at 182. This line shows a striking saw-tooth pattern, which the eye can readily detect as salient seams. It may be possible to adjust all of the brightness, colorimtry and edge blend parameters of the array to make a perfectly seamless and integrated image, at one location. However, and because the screen is assumed to be non-Lambertian, if the viewing position is shifted left or right the seams again become evident. In accordance with the present invention, however, by increasing the overlap, the amount of modulation decreases for a given off-axis viewing angle. Referring to FIG. 8, lines representing the modulation of 10, 20, 30, 40, and 50 percent overlap are shown at 184, 186, 188, 190, and 192, respectively. As is evident, these lines become progressively more linear as the amount of overlap is increased.

Accordingly, the present invention contemplates providing a larger overlap than is recognized by the prior art, and more specifically, an overlap of more than 25%, and more preferably about 50% or more. As indicated in FIG. 8, overlaps of less than 25% permit extensive seam artifacts to emerge. By providing an overlap of more than 25%, the seams in the composite image may be reduced over a wider viewing angle.

Figure 9:
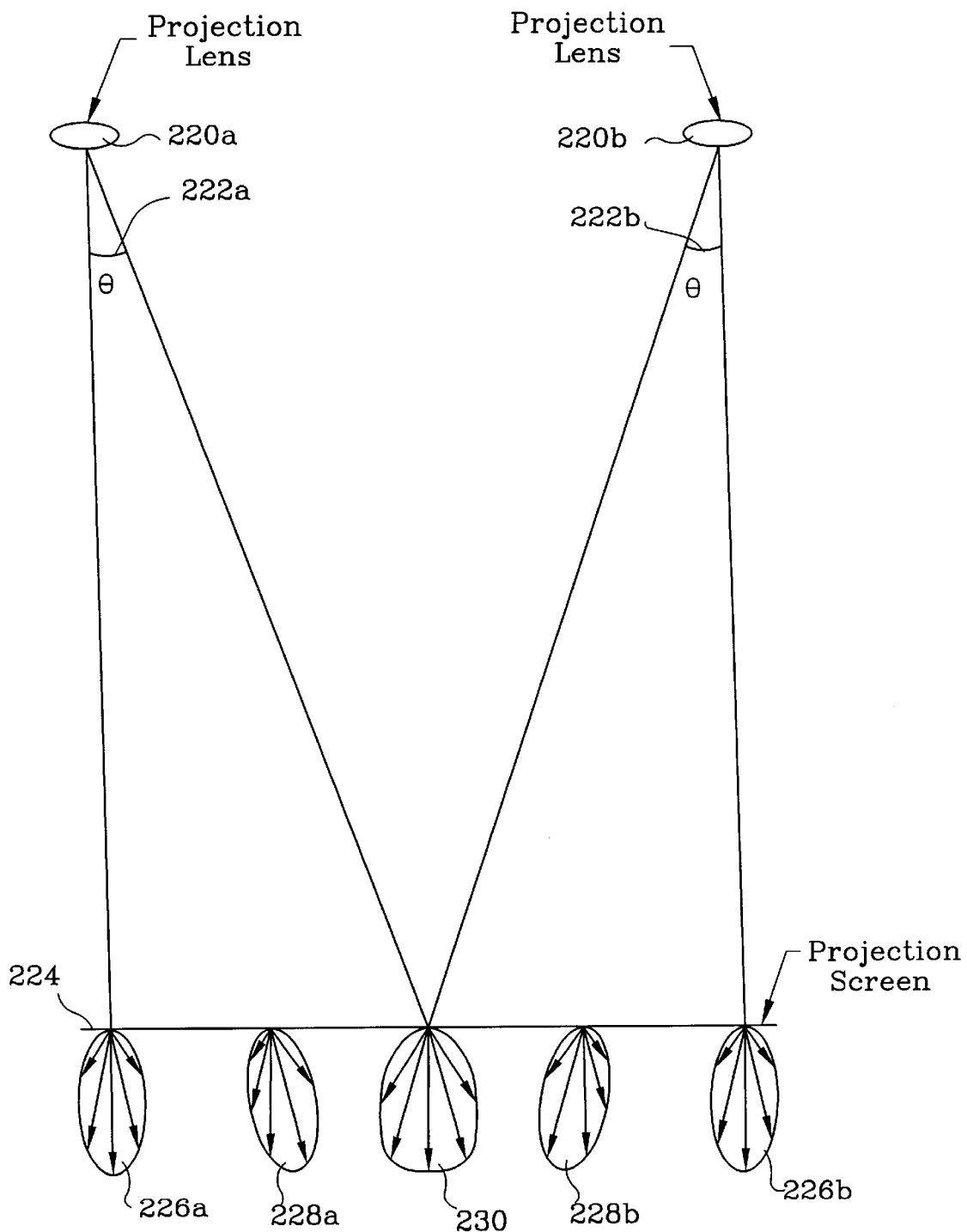
FIG. 9 is a schematic diagram showing the angular distribution of light rays at the screen using projectors having a 15 degree field-of-view, and zero percent overlap of the images.

FIG. 9 is a schematic diagram showing the angular distribution of light rays at a non-Lambertian screen 224 using projectors 220a and 220b, each having a 15 degree field-of-view, and collectively providing zero percent overlap of the corresponding images. While each projector 220a and 220b is simply illustrated as a projection lens, it is understood that other components are also included including a light source, etc.

Figure 1:
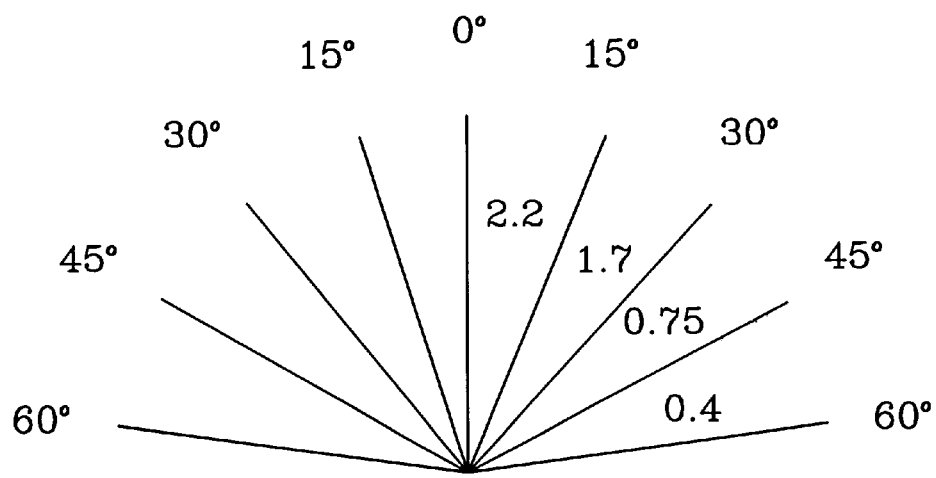
FIG. 1 and FIG. 2 are diagrams showing the passive gain characteristics of a typical rear projection screen.
Figure 2:
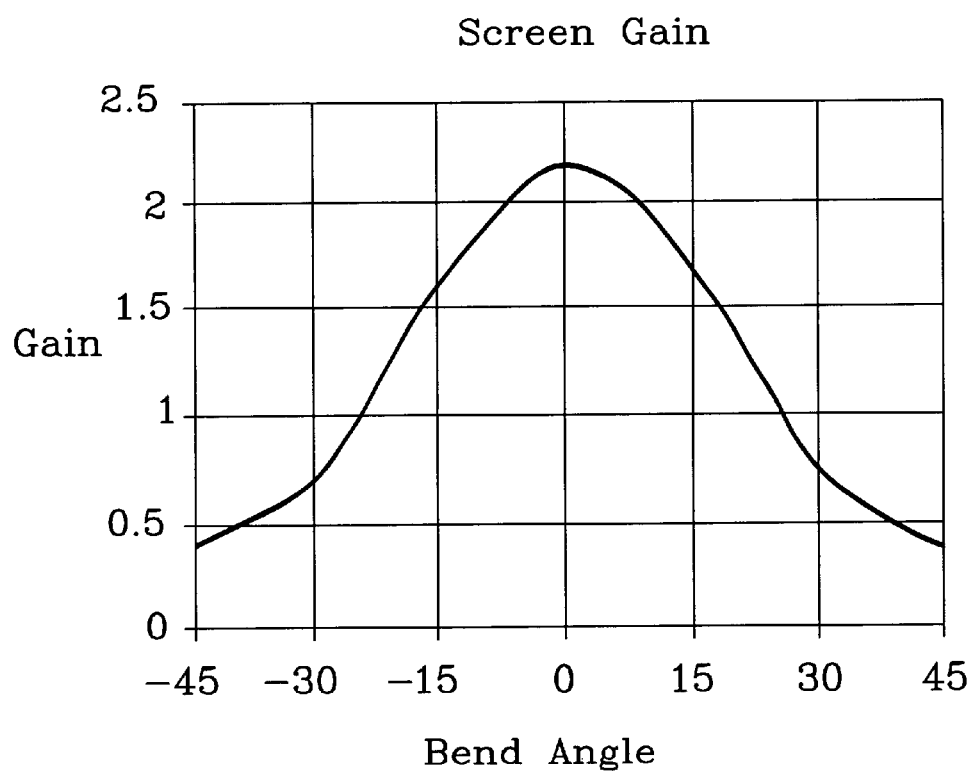

The first projector 220a projects a light spray pattern with a field of view represented by θ 222a. The light rays that strike normal to the surface of the screen 224 produce an elliptical light distribution pattern, as shown at 226a. The elliptical light distribution pattern is caused by the passive gain characteristics of the screen. A Lambertian screen (e.g. one having a gain of one) would provide a light distribution pattern that resembles a half-sphere, indicating that the same luminance is produced in all directions. Illustrative passive gain characteristics of non-Lambertian screens are shown and described with reference to FIG. 1 and FIG. 2. The light rays that strike the screen 224 about 7.5 degrees off-axis produce an elliptical light distribution pattern that is tilted by about 7.5 degrees relative to the screen, as shown at 228a.

Likewise, the second projector 220b projects a light spray pattern with a field of view represented by θ 222b. The light rays that strike normal to the surface of the screen 224 produce an elliptical light distribution pattern, as shown at 226b. The light rays that strike the screen 224 about −7.5 degrees off-axis produce an elliptical light distribution pattern that is tilted by about −7.5 degrees relative to the screen, as shown at 228b. Both projectors 220a and 220b project light rays that strike ±115 degrees off-axis, respectively. These light rays intersect to produce an egg-shaped light distribution pattern, as shown at 230.

It is possible to adjust all of the colorimtry and edge blend parameters of the array to make a perfectly seamless and integrated image. However, because the light distribution patterns are non-symmetrical, if the viewing location is shifted left or right, the seams again become evident.

Figure 10:
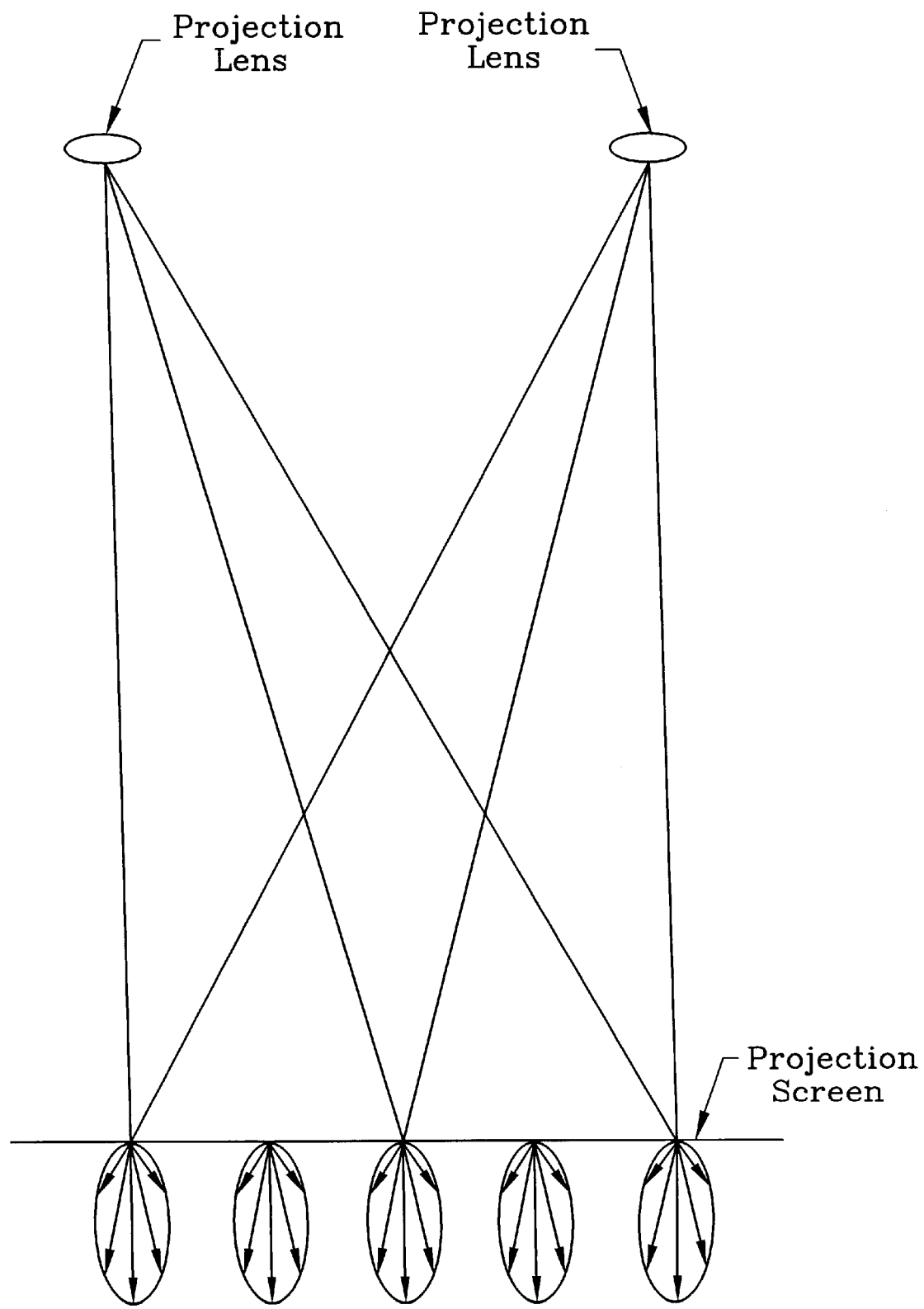
FIG. 10 is a schematic diagram showing the angular distribution of light rays at the screen using projectors having a 15 degree field-of-view, and 50 percent overlap of the images.

FIG. 10 is a schematic diagram showing the angular distribution of light rays at the screen using projectors having a 15-degree field-of-view, and 50 percent overlap of the images. With 50 percent overlap, each of the light distribution patterns is relatively symmetrical with respect to the screen and to each other. Thus, it is possible to adjust all of the luminescence, colorimtry and edge blend parameters of the array to make a seamless and integrated image over a wider viewing angle.

Figure 11:
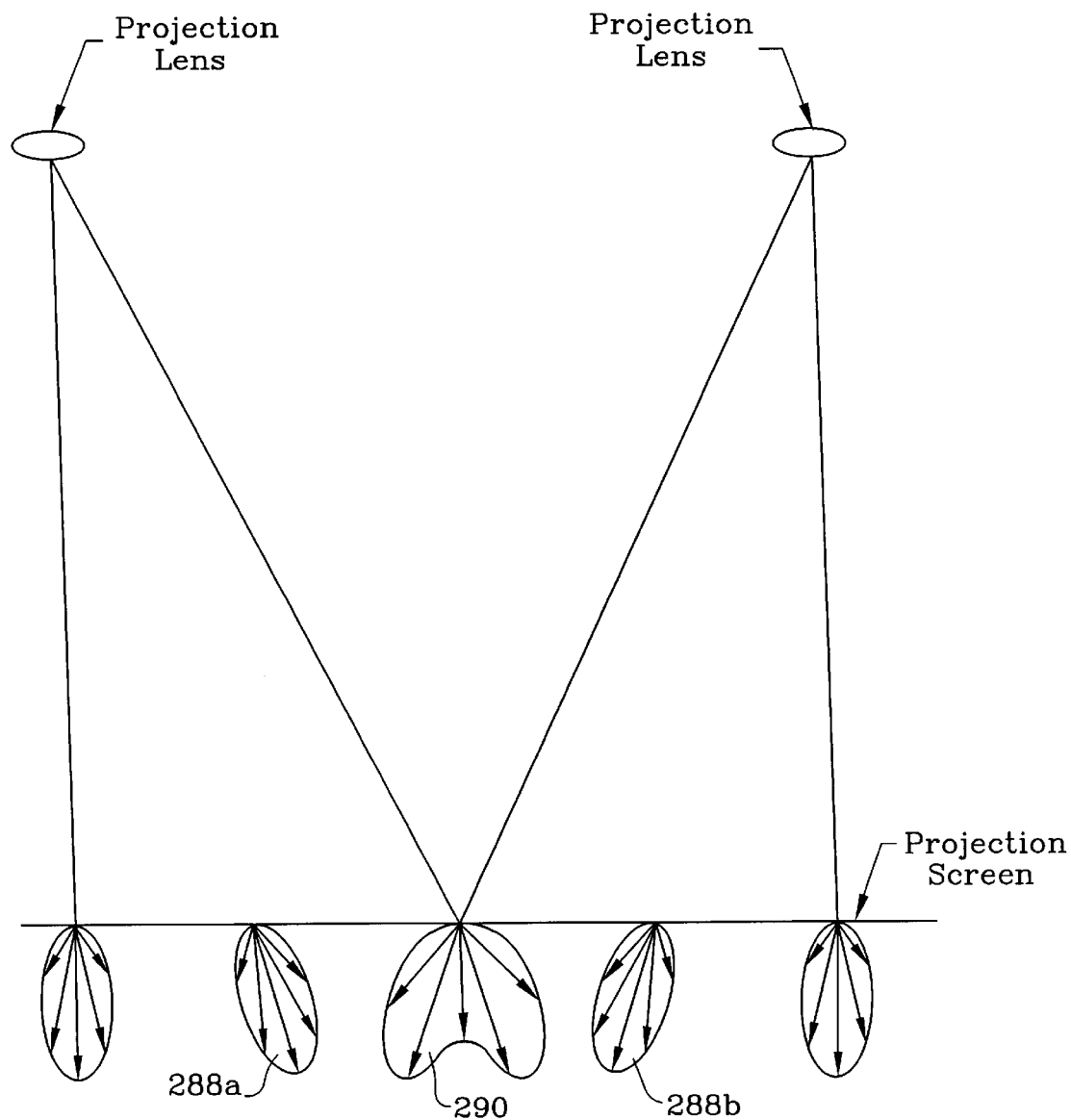
FIG. 11 is a schematic diagram showing the angular distribution of light rays at the screen using projectors having a 30 degree field-of-view, and zero percent overlap of the images.

FIG. 11 is a schematic diagram showing the angular distribution of light rays at the screen using projectors having a 30 degree field-of-view, and zero percent overlap of the images. When the field-of-view of the projectors is increased, the amount that the corresponding light distribution patterns become tilted relative to the screen tends to increase. For example, the elliptical light distribution patterns 288a and 288b are tilted about ±15 degrees relative to the screen, rather than only 7.5 degrees. Further, the intersection of the light rays from both projectors 280a and 280b produce a heart shaped light distribution pattern, as shown at 290. Because the light distribution patterns are even more non-symmetrical than that shown in FIG. 9, a smaller shift in the viewing position can reveal the seams.

Figure 12:
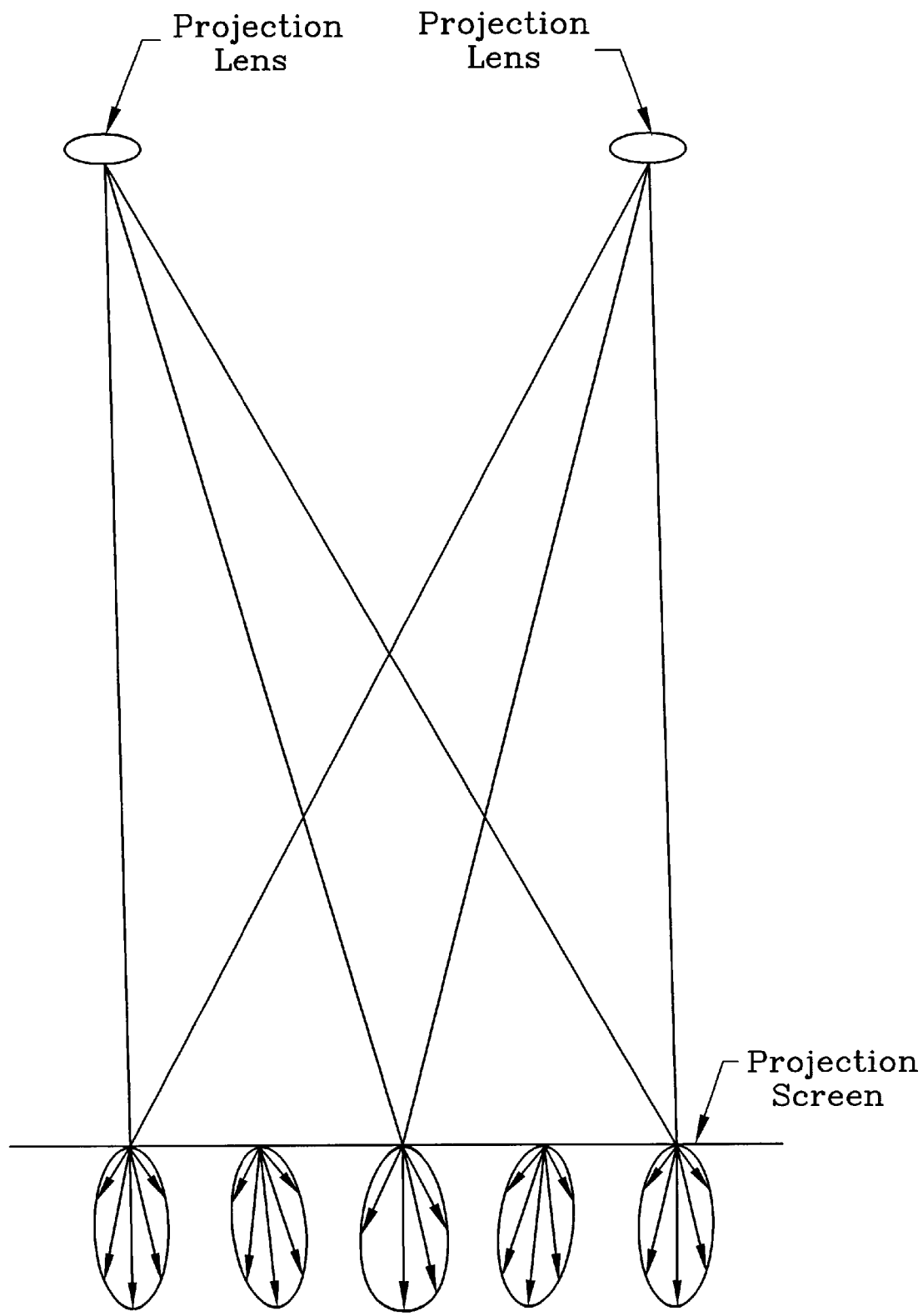
FIG. 12 is a schematic diagram showing the angular distribution of light rays at the screen using projectors having a 30 degree field-of-view, and 50 percent overlap of the images.

FIG. 12 is a schematic diagram showing the angular distribution of light rays at the screen using projectors having a 30-degree field-of-view, and 50 percent overlap of the images. As can be seen, with 50 percent overlap, each of the light distribution patterns is more symmetrical than with zero percent overlap. Thus, it is possible to adjust all of the luminescence, colorimitry and edge blend parameters of the array to make a seamless and integrated image over a wider viewing angle. However, it is also recognized that using a projector with a smaller field-of-view can increase the viewing angle that can be accommodated while still maintaining an apparent seamless image.

Figure 13:
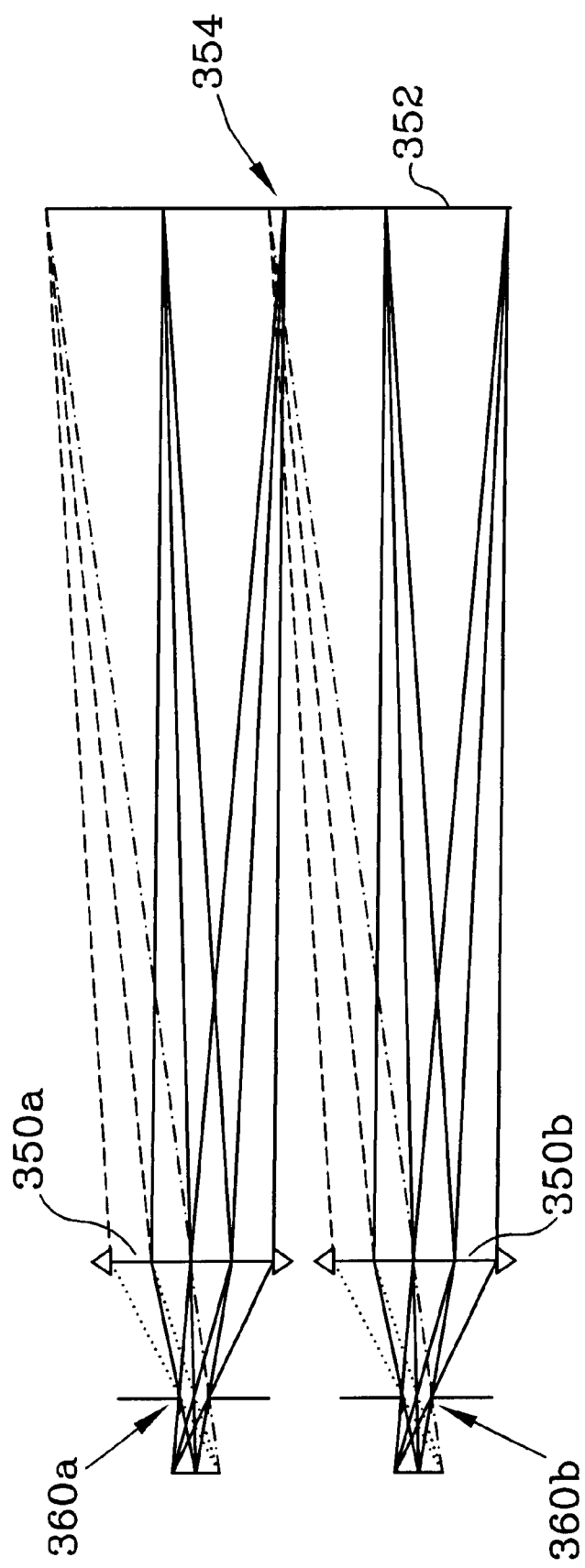
FIG. 13 is a schematic diagram showing a projector system having an aperture and a lens to reduce the angular variation in the light input that is provided to the screen.

FIG. 13 is a schematic diagram showing a projector system having an aperture and a lens to reduce the angular variation in the light input that is provided to the screen. As indicated above, the amount of overlap that is required to reduce the seams of the composite image to an acceptable level over a predetermined viewing angle depends on a number of factors including the field-of-view and aperture size of each of the projectors, the screen gain profile, the blending function used, etc. To reduce the overlap that is required, it is contemplated that the field-of-view of the projectors may be reduced. By reducing the field-of-view of the projectors, the angular distribution of the light input provided to the screen is reduced, and the shift variance of the output image is reduced, as described above.

To help reduce the field of view of the projectors, one or more lenses 350a and 350b may be provided adjacent each projector. The lenses 350a and 350b are preferably sufficiently spaced from the screen 352 so that the images produced by adjacent projectors are allowed to overlap on the screen 352. It is contemplated that the lenses may be Fresnel lenses, and may be positioned to not correspond to the image or object focal planes. Positioning the Fresnel lenses here has the benefit of reducing the impact of the granularity and structure of the lenses. It is also contemplated that a sheet of Fresnel lenses may be suspended between the projector and the screen, and preferably pulled taut midway or so between the projector and the screen.

A small overlap region 354 between adjacent discrete images is preferably provided. The small overlap region 354 is preferably more than just a few pixels (e.g.>5 pixels). A blending function may then be used to gradually transition from one tile to the next, as described above.

It is contemplated that an aperture 360a may be provided between the lens 350a and the corresponding projector, as shown. Likewise, an aperture 360b may be provided between the lens 350b and the corresponding projector. The lenses 350a and 350b receive the light rays through the apertures 360a and 360b, and direct the light relatively uniformly toward the screen. Preferably, the field-of-view of each lens 350a and 350b is greater than zero, and the spacing of the lenses is such that an overlap 354 is provided between adjacent images. However, it is recognized that the field-of-view may be made small enough so that little or no overlap may be required to achieve a seam modulation of less than one Just-Noticeable-Difference (JND). For example, it has been found that by providing a field-of-view of about 3 degrees in combination with a Jenmar screen, a seam modulation of less than one JND was produced. Thus, by properly selecting the field-of-view of the projection system, the screen gain, and other parameters, the desired seam modulation may be achieved over a desired viewing angle.

Figure 14:
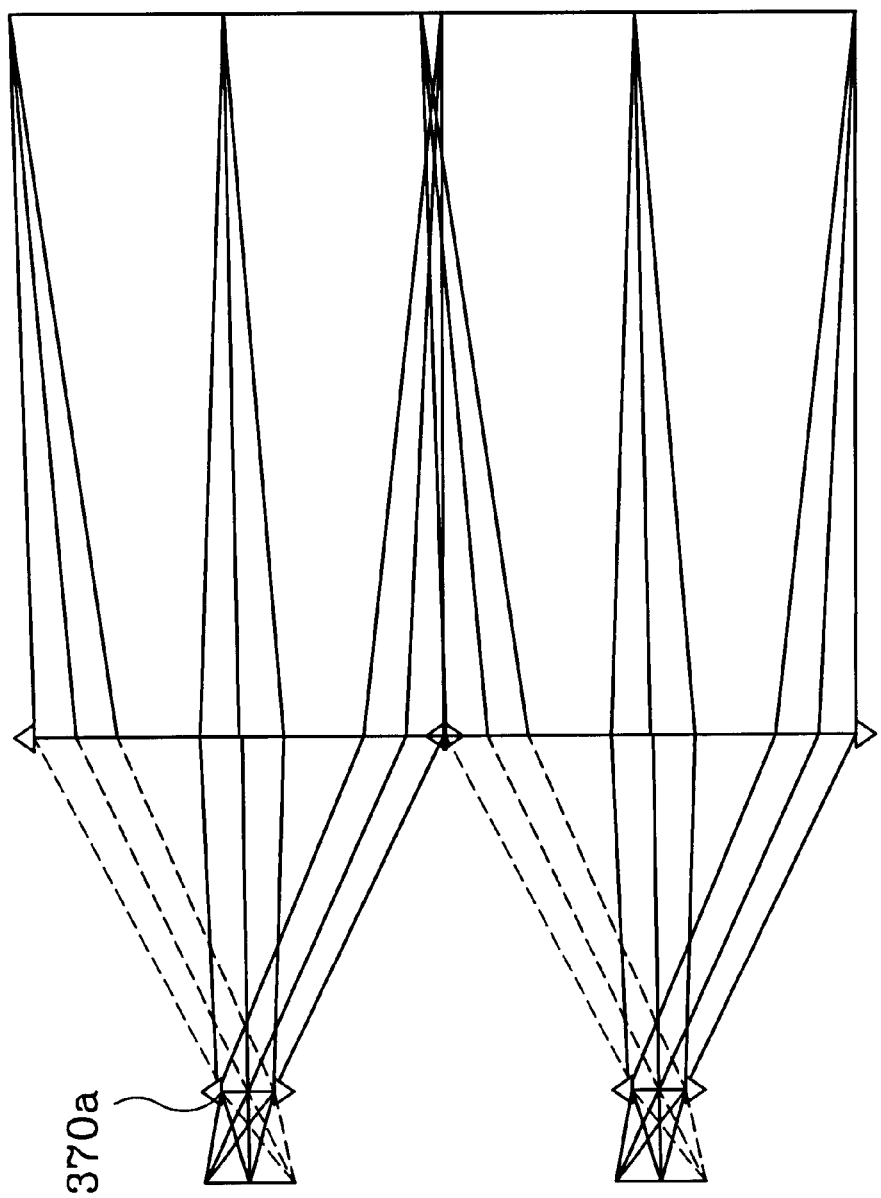
FIG. 14 is a schematic diagram showing a projector system similar to FIG. 13, with a second lens in lieu of, or adjacent to, the aperture of FIG. 13.
Figure 15:
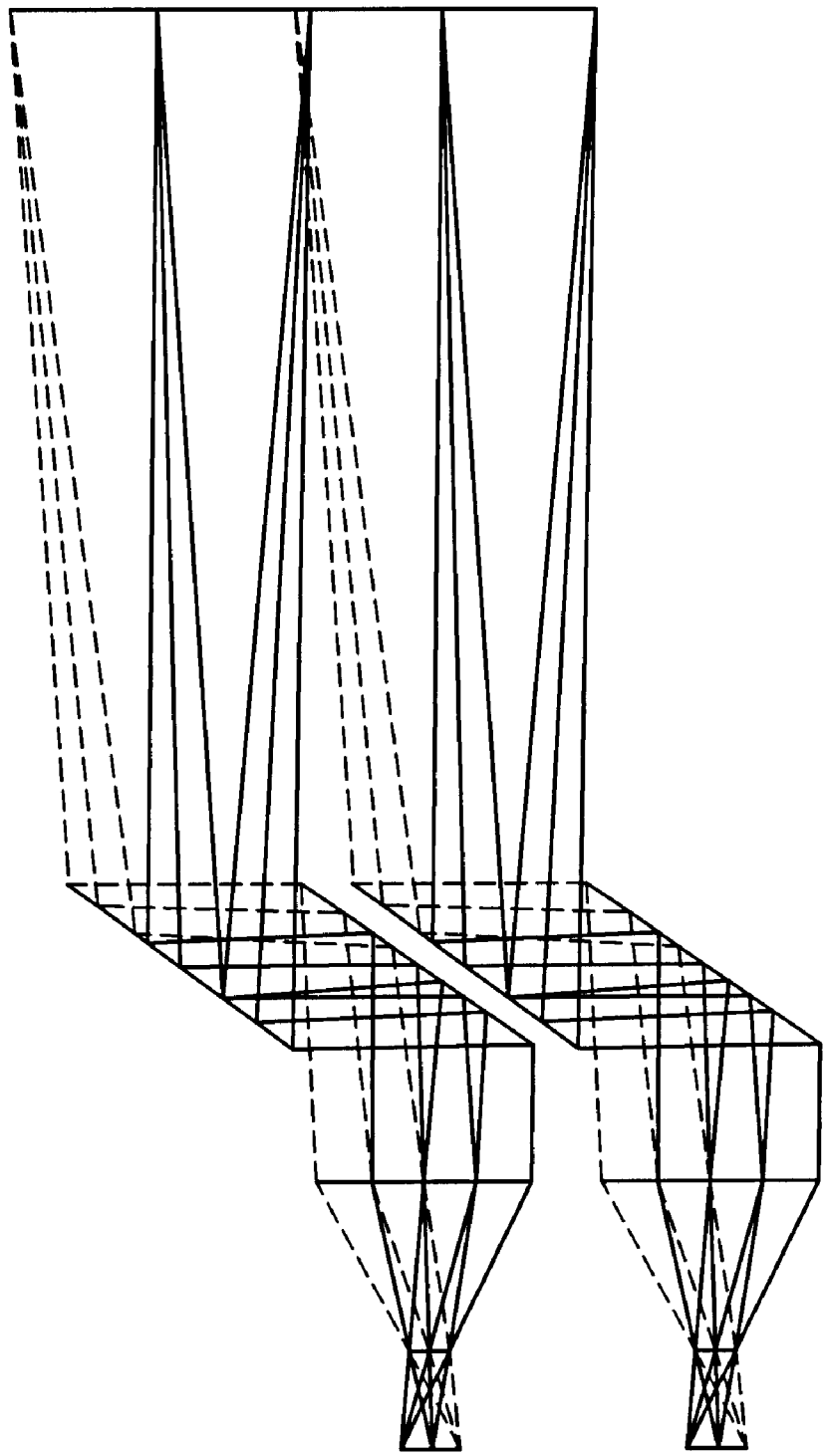
FIG. 15 is a schematic diagram showing a projector system similar to FIG. 13 that uses a reflective system to shorten the distance between the aperture and the screen.

FIG. 14 is a schematic diagram showing a projector system similar to FIG. 13, with a second lens in lieu of, or adjacent to, the aperture of FIG. 13. By providing a second lens 370a, the distance that is required between the projector and the screen is reduced, while still allowing a selected degree of seam modulation. FIG. 15 shows that reflective or catadioptric systems may also be used to help reduce the distance between the projectors and the screen.

Another factor that contributes to the performance of the system is vignetting. If the Fresnel lenses are sized so that they vignette appropriately, the projectors can be placed closer together. This means that it is possible to have smaller field-of-views and larger overlaps than could be achieved if there was no vignetting. In addition to allowing greater overlap, the vignetting tends to reduce the amount of light reaching the edges of the displays. By properly designing the optics, and in particular the Fresnel lenses, the vignetting may provide a built in blending function between tiles.

Figure 16:
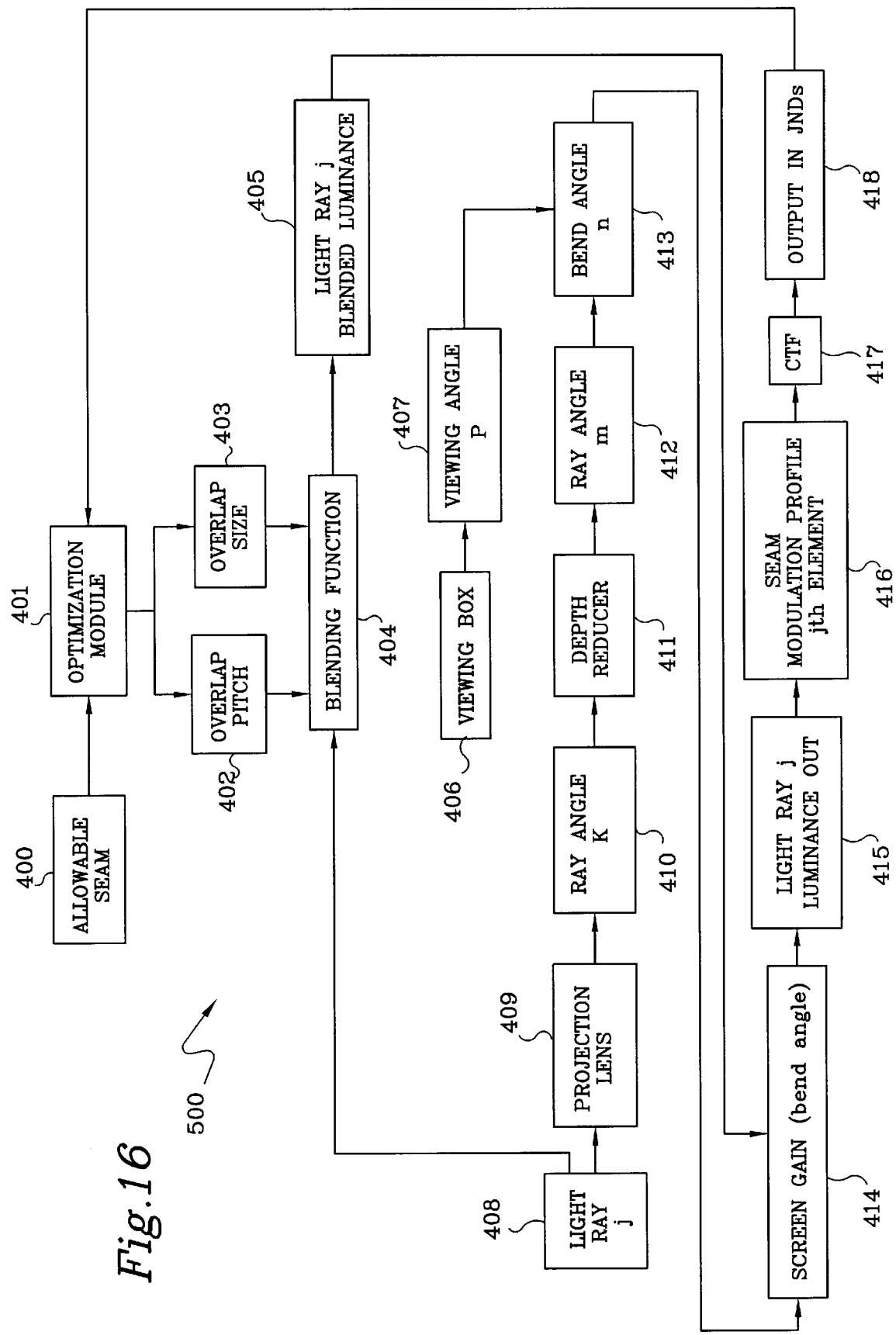
FIG. 16 is a schematic diagram showing a seam optimization apparatus and method in accordance with the present invention.

All of the above embodiments are examples of implementations that may be produced by the seam optimization apparatus and method 500 shown in FIG. 16. The seam optimization system 500 comprises an optimization module 401 as its central element. The optimization module may include a processor that is programmed to perform an embedded optimization algorithm. The processor may be implemented using a DSP, FPGAs, ASICs, a general-purpose processor, a PC either separately or in combination as appropriate for each application.

The optimization algorithm may be implemented as a least square error routine, a Levinson-Marquardt error reduction routine, a genetic algorithm optimization search method, a fuzzy control algorithm, a neural network null seeking algorithm, a cognitive map method or any other control algorithm for optimizing and controlling the system.

The optimization algorithm may further be embodied in a realtime or non-realtime implementation.

The optimization module 401 preferably reduces the output JND measure or equivalent error metric to a value of less than epsilon, where epsilon is the allowable final error. In general, the optimization module 401 models the output of each stage in the seamless tiling system to produce a modulation function of the seams as the human eye would see them. This is typically done for flat field images applied to the system.

The modulation function may be modeled on a ray by ray basis resulting in a Seam Modulation Profile jth element 416 which may be a portion of the overall global profile of the seam produced by the system 500. The global profile of the seam is defined as the function seen over the entire display. The optimization module 401 may output Overlap Pitch 402 and Overlap Size 403 either incrementally or continually in a dynamic feedback loop.

The Overlap Pitch 402 and the Overlap Size 403 affix the span of the Blending Function 404, which as noted elsewhere herein, may be implemented as a ramp, a spline, a trigonometric, a polynomial or some other equivalent blending function. The Blending Function 404 may include the composite effects of the mathematical blending function, as well as other system elements such as the Projection Lens 409, the Depth Reducer 411, etc. The primary purpose of the composite blending function 404 is to alter the amplitude of each Light Ray 408 in a deliberate manner so as to effect the reduction of seam error to less than one epsilon. The blending function 404 is preferably applied to the digital or analog image, which may be provided by a DMD, LCD or similar device.

The projection lens 409 may alter the direction of a ray to produce a new Ray angle 410, which may be a wide or narrow field of view (FOV). The new Ray angle 410 is then transmitted through a Depth Reducer component 411. The Depth Reducer component 411 may be implemented as a lens, a Fresnel lens 350a, a folding optical element as shown for example in FIG. 15, etc. The Depth Reducer 411 may alter the Ray Angle k 410 to produce image element Ray Angle "m" 412. As noted above, the Ray Angle "m" 412, in combination with Viewing Angle "p" 407, produces Bend Angle "n" 413 which determines substantially how the screen gain will be applied to the ray amplitude.

The optimization system 500 may also comprise a Viewing Box 406. The Viewing Box 406 helps define the cycles per degree subtended by the resultant seam modulation function. The geometry of the viewing box in relation to the screen defines the degrees of freedom and the range the eye reference point is allowed to move as a function of each application. The Viewing Box 406 preferably provides both the distance to the display and also the range of Viewing Angles 407 that may be accommodated by the application. Together with the Ray Angle "m"412, the Viewing Angle "p" 407 defines the Bend Angle "n" 413 that will be applied to the screen which has a Screen Gain 414 (which is known to be a function of the bend angle 417).

The Screen Gain 414 may result in a Light Ray Luminance Output 415 which has angular and amplitude attributes that are visible to the viewer whose view may span the viewing box 406, which may be a complex geometrical volume for one to many viewers. The Screen Gain may be that of a front or rear projection screen. The resultant output, Light Ray "j" Luminance Out 415 is tallied in Seam Modulation Profile jth element 416. Seam Modulation Profile jth element 416 is integrated into differential elements in the optimization system to calculate the global Seam Modulation Profile as seen over the entire display and over the range of all viewing angles in the Viewing Box, 406. The Seam Modulation Profile jth element 416 may be converted into a spatial frequency profile for calculation of JND or equivalent perceptual value, thereby resulting in a feedback element to the Optimization Module 401.

The error metric of the optimization system 500 may include a Contrast Threshold Function (CTF) block 417. The CTF block 417 may be optimized for the human vision system. For example, the allowable error as indicated by the allowable seam 400 may be a function of spatial frequency. More modulation is typically allowed at spatial frequencies higher and lower than about 6 cycles per degree, which is the point of optimal human vision sensitivity. The error function may be expressed in terms of the spatial frequency domain by using a Fourier Transform, a Discrete Cosine Transform, a Wavelet Transform, a Cepstrum or any other suitable frequency transform. The output of the CTF block 417 is preferably a JND or equivalent perceptual metric of the modulation amplitude of the seam. This may be expressed as a JND value per degree of view angle or as a JND output as a function of x and y which span the viewing area of the display or an equivalent geometric description of the seam modulation values.

The Optimization Module 401 may then produce an error function by subtracting (or equivalent operation) the Allowable Seam 400 from the Output JNDs feedback element 418, and may make system adjustments to reduce the resulting difference to null. For example, the Optimization Module 401 may produce a Blending Function coefficient adjustment for the Blending Function 404 so as to more effectively null the error to zero.

The aforementioned embodiments are merely illustrative examples of a system in accordance with the present invention. For a small headbox, like a fighter cockpit application in which the head of the user may actually be tied by straps to a small view volume, an overlap of a 3% with a Depth Reducer having no effect on the ray angle and using a Jenmar screen may result in a seamless system. For a control room application in which many viewers may be spread over a large area and a Jenmar screen is used and no Depth Reducer is used, then a 50% overlap may be required. For an application in which depth is significant and the overlap must be held to greater than or equal to 5% for error distribution reasons, and must be held to 5% for cost reasons, then a Depth Reducer must typically be applied to achieve the seamless value as determined by a spatial frequency optimization routine.

Having thus described the preferred embodiments of the present invention, those of skill in the art will readily appreciate that the teachings found herein may be applied to yet other embodiments within the scope of the claims hereto attached.

What is claimed is:

1. A display for producing a seamless composite image from at least two discrete images, comprising:
   a non-Lambertian screen;
   projection means for projecting each of the discrete images separately onto the screen, said projection means projecting the discrete images such that at least one of the discrete images overlaps at least one other of the discrete images by more than 25 percent, thereby forming at least one overlap region;
   blending means coupled to said projection means for blending a selected characteristic of at least one of the discrete images in the at least one overlap zone.

2. A display according to claim 1, wherein at least one of the discrete images overlaps at least one other of the discrete images by about 50 percent or more.

3. A display according to claim 1, wherein the screen has a gain that is greater than one.

4. A display according to claim 1, wherein the screen has a front and a back, and is at least partially transmissive, the projection means projecting each of the discrete images on the back of the screen.

5. A display according to claim 1, wherein the selected characteristic is selected from the group consisting of hue, luminance, brightness, color, contrast modulation and spatial frequency.

6. A display according to claim 1, wherein the blending means multiplies the selected characteristic of the at least one discrete image in the at least one overlap region by a blending function.

7. A display according to claim 6, wherein the blending function is a ramp function.

8. A display according to claim 7, wherein the ramp function is a two-dimensional ramp function.

9. A display according to claim 1, wherein said projection means receives at least two discrete video signals that are used to generate the at least two discrete images.

10. A display according to claim 9, wherein the blending means blends the selected characteristic of the at least one discrete image by modifying the corresponding discrete video signal.

11. A display for producing a seamless composite image from at least two discrete images, comprising:
   a non-Lambertian screen;
   projection means for projecting each of the discrete images separately onto the screen, said projection means projecting the discrete images such that at least one of the discrete images overlaps at least one other of the discrete images by more than 25 percent, thereby forming at least one overlap region;
   blending means coupled to said projection means for blending a selected characteristic of at least one of the discrete images in the at least one overlap region; and
   wherein the blending means is selected to reduce the selected characteristic to be less than one JND.

12. A display according to claim 11, wherein the one JND is defined using the contrast sensitivities of a human visual system.

13. A display according to claim 11, wherein the JND is defined using the contrast modulation and spatial frequency sensitivites of a human visual system.

14. A display according to claim 11, wherein the JND is defined using the hue contrast sensitivities of a human visual system.

15. A display according to claim 11, wherein the JND is defined using the luminance contrast sensitivities of a human visual system.

16. A display for producing a seamless composite image from at least two discrete images, comprising:
   a screen;
   at least two projectors for projecting the at least two discrete images separately onto the screen, said projectors projecting the discrete images such that at least one of the discrete images overlaps at least one other of the discrete images by about 50 percent, thereby forming at least one overlap region; and
   a blending element coupled to at least one of said projectors for blending a selected characteristic of at least one of the discrete images in the at least one overlap region.

17. A display according to claim 16, wherein each of the at least two projectors receive a discrete video signal that corresponds to one of the at least two discrete images.

18. A display according to claim 17, wherein the blending element blends the selected characteristic of the at least one discrete image by modifying the corresponding discrete video signal.

19. A method for producing a seamless composite image from at least two discrete images, the method comprising the step of:
   projecting the at least two discrete images separately onto a screen such that at least one of the discrete images overlaps at least one other of the discrete images by more than 25 percent, thereby forming at least one overlap region.

20. A method according to claim 19, further comprising the step of blending a selected characteristic of at least one of the discrete images in the at least one overlap region.

21. A method according to claim 20, wherein the selected characteristic is selected from the group consisting of brightness and color.

22. A method according to claim 20, wherein the blending step includes the steps of multiplying the selected characteristic of the at least one discrete image in the overlap region by a predefined blending function.

23. A method according to claim 22, wherein the predefined blending function is a ramp function.

24. A method according to claim 19, wherein the projecting step projects the at least two discrete images separately onto a screen such that at least one of the discrete images overlaps at least one other of the discrete images by about 50 percent or more, thereby forming at least one overlap region.

25. A display for producing a seamless composite image from at least two discrete images, comprising:
   a screen;
   at least two projectors for projecting the at least two discrete images separately onto the screen;
   one or more lenses each associated with a corresponding one of the number of projectors, the one or more lenses spaced from the screen sufficiently so that at least one of the discrete images overlaps at least one other of the discrete images, each of the lenses disposed between the screen and a corresponding projector in order to reduce the field of view of the projector; and
   a blending element coupled to at least one of said projectors for blending a selected characteristic of at least one of the discrete images in the at least one overlap region.

26. A display according to claim 25, wherein the one or more lenses are one or more Fresnel lenses.

27. A display according to claim 26, wherein the one or more Fresnel lenses are provided in a sheet of Fresnel lenses.

28. A method comprising the steps of:
   providing a number of projectors for projecting at least two discrete images separately onto a screen such that at least one of the discrete images overlaps at least one other of the discrete images, thereby forming at least one overlap region;
   providing a blending function to blend the discrete images in the overlap region; and
   adjusting the overlap of the discrete images to achieve a selected modulation in the overlap region for a desired viewing angle.

29. (Amended) A method comprising the steps of:
   providing a number of projectors for projecting at least two discrete images separately onto a screen such that at least one of the discrete images overlaps at least one other of the discrete images, thereby forming at least one overlap region;
   providing a blending function to blend the discrete images in the overlap region;
   adjusting the overlap of the discrete images, the field of view of the number of projectors, the non-linear attributes of the screen, and the blending function to achieve a selected modulation in the overlap region for a desired viewing angle; and
   wherein the selected modulation is less than one JND.

30. A method according to claim 29, wherein the one JND is defined using the contrast sensitivities of a human visual system.

31. A method according to claim 29, wherein the JND is defined using the contrast modulation and spatial frequency sensitivities of a human visual system.

32. A method according to claim 29, wherein the JND is defined using the hue contrast sensitivities of a human visual system.

33. A method according to claim 29, wherein the JND is defined using the luminance contrast sensitivities of a human visual system.

34. A method comprising the steps of:
- providing a number of projectors each having a field of view for projecting at least two discrete images separately onto a screen such that at least one of the discrete images overlaps at least one other of the discrete images, thereby forming at least one overlap region;
- providing a blending function to blend the discrete images in the overlap region; and
- adjusting of the field of view of one or more of the number of projectors to achieve a selected modulation in the overlap region for a desired viewing angle.

35. A method comprising the steps of:
- providing a number of projectors for projecting at least two discrete images separately onto a screen such that at least one of the discrete images overlaps at least one other of the discrete images, thereby forming at least one overlap region, the screen having one or more non-linear attributes;
- providing a blending function to blend the discrete images in the overlap region; and
- adjusting the non-linear attributes of the screen to achieve a selected modulation in the overlap region for a desired viewing angle.

36. A display for producing a seamless composite image from at least two discrete images, comprising:
- a screen;
- at least two projectors for projecting the at least two discrete images separately onto the screen;
- one or more lenses each associated with a corresponding one of the at least two projectors, the one or more lenses spaced from the screen sufficiently so that at least one of the discrete images overlaps at least one other of the discrete images, each of the one or more lenses disposed such that light rays from a corresponding projector strike the screen at an angle closer to the normal than would occur without the lens; and
- a blending element coupled to at least one of said projectors for blending a selected characteristic of at least one of the discrete images in the at least one overlap region.

37. A display for producing a seamless composite image from at least two discrete images, comprising:
- a screen;
- at least two projectors for projecting the at least two discrete images separately onto the screen;
- one or more lenses each associated with a corresponding one of the at least two projectors, the one or more lenses spaced from the screen sufficiently so that at least one of the discrete images overlaps at least one other of the discrete images, at least one of the lenses being configured to cause the image of the corresponding projector to vignette.

38. A display for producing a seamless composite image from at least two discrete images, comprising:
- a screen;
- at least two projectors for projecting the at least two discrete images separately onto the screen;
- one or more lenses each associated with a corresponding one of the at least two projectors, the one or more lenses being positioned at a location not in the focal plane of a projector lens.

* * * * *